Figure 1:
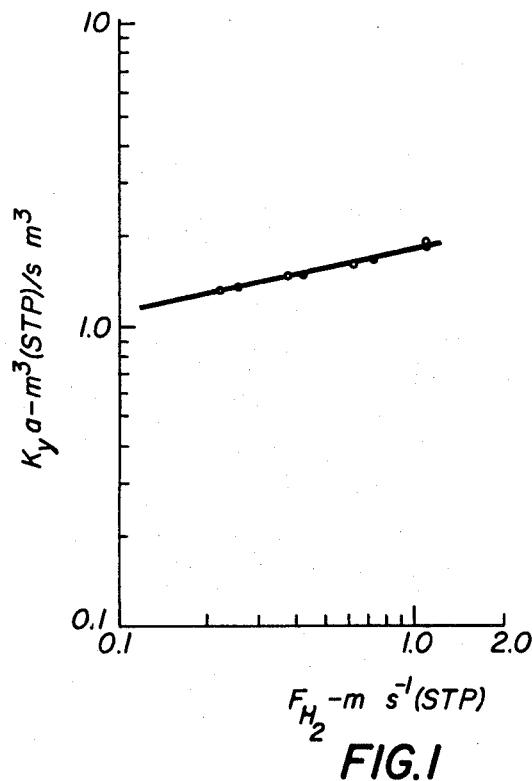

United States Patent [19]

Butler et al.

[11] 4,228,034
[45] Oct. 14, 1980

[54] CATALYTICALLY ACTIVE MASS FOR THE EXCHANGE OF HYDROGEN ISOTOPES BETWEEN STREAMS OF GASEOUS HYDROGEN AND LIQUID WATER

[75] Inventors: John P. Butler; John H. Rolston; James den Hartog, all of Deep River; Fred W. R. Molson, Petawawa; John W. Goodale, Deep River, all of Canada

[73] Assignee: Atomic Energy of Canada Limited, Ottawa, Canada

[21] Appl. No.: 959,712

[22] Filed: Nov. 13, 1978

Related U.S. Application Data

[63] Continuation-in-part of Ser. No. 877,466, Feb. 13, 1978, abandoned, which is a continuation-in-part of Ser. No. 733,422, Oct. 18, 1976, abandoned.

[30] Foreign Application Priority Data

Jun. 25, 1976 [CA] Canada ................................. 255751

[51] Int. Cl.² .......................................... B01J 31/02
[52] U.S. Cl. .................................... 252/430; 252/428; 252/477 R
[58] Field of Search ................... 252/430, 427, 477 R, 252/428

[56] References Cited

U.S. PATENT DOCUMENTS 4,025,560   5/1977   Rolston et al. .................... 43/648 A

FOREIGN PATENT DOCUMENTS 2521924   12/1975   Fed. Rep. of Germany .

Primary Examiner—O. R. Vertiz
Assistant Examiner—Wayne A. Langel
Attorney, Agent, or Firm—Francis W. Lemon

[57] ABSTRACT

For the exchange of hydrogen isotopes between streams of gaseous hydrogen and liquid water, wherein the streams are at a temperature in the range 273 to 573K are brought into contact with one another and a catalytically active mass, an improved catalytically active mass is provided comprising an inherently hydrophotic, porous, polytetrafluoroethylene matrix and partially platinized carbon particles dispersed throughout the whole of the porous polytetrafluoroethylene matrix in the weight ratio of 1:1 to 3:1 of polytetrafluoroethylene to partially platinized high surface area carbon particles. The inherently hydrophobic, porous, polytetrafluoroethylene matrix allows the catalytically active metal to catalyze the hydrogen isotope exchange reaction between hydrogen gas and water vapor in the presence of liquid water while retarding loss of activity of the catalytically active metal by contact of the metal catalyst with liquid water. This catalyzed chemical isotope exchange proceeds simultaneously with isotope exchange from water vapor to liquid water by a non-catalyzed, physical evaporation and condensation exchange reaction. The efficient coupling of these two isotopic transfer steps which results in a rapid overall isotopic exchange between hydrogen and liquid water without a pronounced loss of activity of the catalytically active mass is dependent upon the weight ratio of the catalytically active platinized carbon to the polytetrafluoroethylene matrix being in the above mentioned range of 1:1 to 3:1.

6 Claims, 5 Drawing Figures

CATALYTICALLY ACTIVE MASS FOR THE EXCHANGE OF HYDROGEN ISOTOPES BETWEEN STREAMS OF GASEOUS HYDROGEN AND LIQUID WATER

This application is a continuation-in-part of application Ser. No. 877,466, filed Feb. 13, 1978, now abandoned, which was a continuation-in-part of application Ser. No. 733,422, filed Oct. 18, 1976, now abandoned.

This invention relates to a catalytically active mass for the exchange of hydrogen isotopes between streams of gaseous hydrogen and liquid water.

U.S. Pat. No. 2,690,379, dated 1954, H. C. Urey and A. V. Gross, discloses a process for the production of deuterium oxide, by bringing hydrogen containing deuterium and water together in a reaction chamber, and a catalyzing the reversible isotopic exchange reaction between them by means of a catalyst selected from or compounded from nickel, cobalt, iron, ruthenium, rhodium, palladium, osmium, iridium, platinum, molybdenum, tungsten and rhenium on a relatively inert support. This isotopic enrichment process is an example of the application of a chemical exchange reaction between two hydrogen-containing species to the separation of two isotopes of hydrogen which differ in their atomic mass. By way of example this chemical exchange reaction can be written in terms of the light isotope, protium (H), and the heavier isotope, deuterium (D) as $$HD_{gas} + H_2O_{liquid} \rightleftharpoons HDO_{liquid} + H_2{}_{gas} \quad (1)$$

where the equilibrium constant, $K_1$, is given in terms of the molar concentrations as $$K_1 = [HDO][H_2]/[HD][H_2O] \quad (2)$$

The degree of isotopic separation for the chemical exchange process between streams of hydrogen and liquid water can be characterized by the separation coefficient, $\alpha$, which is defined as the ratio of the atom ratios of the heavy to light isotopes in the water phase relative to those in the hydrogen gas.

$$\alpha = \frac{[D/H]_{H_2O,\ liquid}}{[D/H]_{H_2,\ gas}} \quad (3)$$

The magnitude of the process separation coefficient, $\alpha$, is proportional to the equilibrium constant, $K_1$, of the chemical exchange reaction and varies with temperature, but as defined, is always greater than unity. Hence, under conditions of isotopic equilibrium between streams of liquid water and hydrogen gas, the deuterium concentration in the liquid water, $(D/H)_{liquid}$, is always greater than the deuterium concentration in the hydrogen gas, $(D/H)_{gas}$. In a separation process in which streams of hydrogen and liquid water, carrying deuterium concentrations other than the equilibrium concentration, are brought into contact with one another, under conditions where re-distribution of the hydrogen isotopes can occur, there will be a net transfer of atoms of the heavy isotope from one phase to the other which is exactly offset by a net transfer of atoms of the light isotope in the opposite direction. As isotopic equilibrium between the two streams is being established, the initial concentration of the heavier hydrogen isotope (deuterium) in the depleted stream will be raised above its initial level to approach the new equilibrium value which is characteristic of the temperature and operating conditions of the process. The net transfer will tend to proceed until the isotopic contents of the two streams reach their equilibrium values, at which point neither stream will contain an excess or a deficiency of the heavier isotope over the equilibrium values given by equation (3).

It is a desirable feature of any practical process involving transfer of hydrogen isotopes between streams of hydrogen and liquid water that the transfer proceed at the highest possible rate so that the equilibrium distribution of the isotopes be attained in the shortest possible time and in smallest possible space. This is particularly important in a multistage or cascade process, such as described by M. Benedict and T. H. Pigford in Nuclear Chemical Engineering, McGraw-Hill, 1957, in which the streams of hydrogen gas and liquid water are required to flow substantially in opposite directions between stages, although not necessarily within each stage. In such a process, a stage can be defined as the unit volume through which streams of hydrogen and liquid water pass and in which the approach to the equilibrium isotope distribution can be measured or calculated in some reasonable manner.

The most economical and efficient way to accomplish a counter-current flow of the two streams is to keep the bulk of the water continuously in the liquid state and to flow this in the opposite direction to the gaseous hydrogen, except for the water vapour that of necessity is contained as humidity in the hydrogen gas in contact with liquid water.

One major problem with the process disclosed in the above United States patent is that, while catalysts have been found to catalyze the hydrogen isotope exchange between hydrogen and water vapour, these same catalysts show a large and undesirable loss of activity when brought into intimate contact with liquid water. The catalytically active metal particles thereby become submerged in liquid water. This drastically limits the rate of the exchange since exchange can only proceed by hydrogen dissolved in the liquid. In the presence of liquid water the resulting activity is too low for the process to be economical and so in the plant described in "Production of Heavy Water", by M. Murphy, H. C. Urey and I. Kirshenbaum, McGraw-Hill Book Co., N.Y. 1955, p. 14, contact of liquid water with the catalyst was prevented by physically separating the catalyst from the stream of liquid water and by maintaining the relative humidity of the process stream below the saturation level while in contact with the catalyst. Such a process, while operable in a satisfactory manner, is expensive, and so it was found desirable to provide a hydrogen isotope exchange process between streams of gaseous hydrogen and liquid water wherein the catalyst assembly need not be physically separated from the stream of liquid water and whereby deactivation of the catalytically active metal by contact with the liquid water stream is retarded.

U.S. Pat. No. 3,888,974, dated June 10, 1975, by W. H. Stevens is directed to the problem of providing a bithermal process for hydrogen isotope exchange between gaseous hydrogen and liquid water using a catalytically active metal wherein deactivation of the catalytically active metal by liquid water is retarded. In Stevens' patent the bithermal process uses a catalyst provided with a substantially liquid-water-repellent organic resin or polymer coating, which is permeable to water vapour and hydrogen gas, and the overall catalytic exchange of isotopes between streams of hydrogen and liquid water primarily occurs by a two-step exchange process with the following simultaneous reactions being closely coupled in space, Step 1

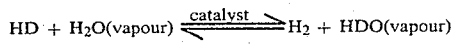

HD + H$_2$O(vapour) $\underset{\longleftarrow}{\overset{\text{catalyst}}{\longrightarrow}}$ H$_2$ + HDO(vapour)

Step 2

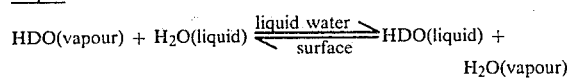

HDO(vapour) + H$_2$O(liquid) $\underset{\longleftarrow}{\overset{\text{liquid water}}{\underset{\text{surface}}{\longrightarrow}}}$ HDO(liquid) + H$_2$O(vapour)

In one embodiment of the Stevens' invention, platinum on a high surface area carbon black powder support, available from several commercial catalyst manufacturers, is slurried with a fluid suspension of colloidal polytetrafluoroethylene particles, and the resulting suspension is then applied to a porous ceramic body. The polytetrafluoroethylene serves not only to wetproof the catalyst body thus provided but also to hold the platinized carbon catalyst particles in place on the relatively larger, porous ceramic support.

It has now been found that improvements in the overall rate of transfer of hydrogen isotopes between hydrogen and liquid water can be obtained by improving the rate of Step 1 and this has been achieved, according to the present invention, by adjusting the amount of platinized carbon in the catalytically active platinized carbon-polytetrafluoroethylene mass which at the same time has been found to advantageously extend the active life of the catalyst.

One problem with catalytically active masses of the type disclosed in the Stevens' patent has been to provide an acceptable rate of catalytic isotopic transfer, Step 1, between hydrogen and water vapour while providing for an effective adhesion of the platinized carbon powder to the catalyst carrier under conditions where effective hydrogen isotopic exchange can occur between hydrogen and liquid water.

It has now been found, according to the present invention, that the effectiveness and permanence of the wetproofing of the catalytically active mass can be enhanced by adjusting the ratio of porous polytetrafluoroethylene to partially platinized carbon.

In German Patent Application No. 25 21 924, filed May 16, 1975, published Dec. 4, 1975, "A Catalyst for Deuterium Enrichment and Its Preparation and Use", Inventors Otto J. Adlhart and Saul G. Hindin, Engelhard Minerals & Chemicals Corp., and claiming the priority of United States Patent application No. 471,340, filed May 20, 1974, there is described a catalyst assembly comprising an inert carrier, a first, hydrophobic polymer, coherent film covering on the inert carrier, and a second, hydrophobic polymer, coherent film covering the first film and containing finely divided metals of Group VIII of the Periodic Table on carbon. In some of the examples given in the Adlhart et al German Patent application, calcined spheres with an initial polytetrafluoroethylene coating were given a catalytically active mass by being dipped in 4 g of 25% platinum on carbon material in a solution of 6 ml of thin polytetrafluoroethylene emulsion (with the polytetrafluoroethylene thinned to 150 mg/ml) together with 20 ml of methylcellulose solution with a concentration of 0.3 wt% methylcellulose. This, and other examples, give in the second coating, polytetrafluoroethylene/platinized carbon ratios in the catalytically active mass in the range 0.0225 to 0.225:1. As will be shown later, while catalysts of this type are undoubtedly an improvement over other known catalysts, a problem still exists in that these catalysts suffer from a pronounced loss of activity after prolonged contact with boiling water.

According to the present invention there is provided a catalytically active mass for the exchange of hydrogen isotopes between streams of gaseous hydrogen and liquid water, comprising:

(a) a porous matrix of polytetrafluoroethylene, and (b) exposed, partially platinized high surface area carbon particles dispersed in the porous matrix of polytetrafluoroethylene, and wherein the improvement comprises:

(c) the exposed, partially platinized high surface area carbon particles are dispersed throughout the whole of the porous matrix of polytetrafluoroethylene in the weight ratio 1:1 to 3:1 of polytetrafluoroethylene to partially platinized high surface area carbon particles.

In some embodiments of the present invention the porous matrix, with the exposed partially platinized high surface area carbon particles therein, is in the form of a coating on a catalyst carrier.

When a catalyst carrier is used it may, in some embodiments of the present invention, consist of ceramics, fibrous materials, synthetic plastics or metals.

A very good catalyst carrier is a stainless steel gauze ring, and a preferred catalyst carrier is corrugated metal sheet or gauze.

The ideal rate of isotope exchange between hydrogen and liquid water in the Stevens' process can only be achieved when the isotope exchange for both of the above mentioned Steps 1 and 2 are optimized. This is a consequence of the coupling of the two simultaneous exchange steps in series so that the net isotope transfer between hydrogen and liquid water proceeds from the isotopically enriched phase, hydrogen, to water vapour and thence to the isotopically depleted phase, liquid water, or the transfer can occur in the reverse direction in the liquid water is the enriched phase. The overall rate of transfer od deuterium $K_ya$, as defined later, can be expressed in terms of rates of Steps 1 and 2, $R_1$ and $R_2$, by the relation $$1/K_ya = 1/R_1 + 1/R_2 \qquad (4)$$

To achieve the highest overall transfer rate of deuterium between hydrogen and liquid water both rates $R_1$ and $R_2$ must be optimized and it is desirable to modify the magnitude of the rates $R_1$ and $R_2$ so that they differ by less than an order of magnitude under the desired operating conditions. If $R_1 >> R_2$ the overall transfer rate is essentially controlled by the magnitude of $R_2$. Since this is not a catalytic step there is no advantage in attempting to increase $R_1$ by further additions of catalytically active metal. If $R_2 >> R_1$ the overall rate, $K_ya$, is being limited by the catalytic rate, Step 1, and thus an increase in the amount of catalytically active metal will increase the overall transfer rate, $K_ya$.

As one would expect for any particular operating condition where the overall rate of exchange is not controlled by Step 2 the rate of isotopic exchange between hydrogen gas and liquid water in the Stevens process, using a partially platinized high surface area carbon/polytetrafluoroethylene catalyst, increases with the percentage by weight of platinum in the total weight of the catalyst, (platinum+high surface area carbon+polytetrafluoroethylene+catalyst carrier). This linear increase of the rate of the overall isotopic exchange rate between hydrogen and liquid water with platinum loading occurs up to a point where the non-catalytic reaction, Step 2, begins to limit the rate of the overall exchange reaction. For higher platinum loadings the increase in the overall exchange rate diminishes as expected since the overall exchange rate between hydrogen and liquid water is being increasingly limited by the rate of the non-catalytic reaction Step 2.

The present invention is based upon the finding that when at least one partially platinized high surface area carbon, polytetrafluoroethylene catalytically active mass is used in the Stevens' process, under conditions where the overall exchange rate is not entirely limited by Step 2, there is a range of weight ratios of polytetrafluoroethylene to partially platinized high surface area carbon in the catalytically active mass for which the rate of isotope exchange and catalyst stability with regard to liquid water is greatest. What is surprising is that this range of weight ratios is the same regardless of the operating conditions, particularly when the amount of catalyst metal present is less than that necessary to raise the rate of the catalytic reaction, Step 1, more than 10 times above the rate of isotopic exchange between water vapour and liquid water by Step 2.

The catalyst may be used as a plurality of discrete bodies disposed as a packed column or bed. The size and shape of the individual bodies are chosen so as to allow the streams of liquid water and hydrogen gas to pass between and around the bodies under conditions consistent with good engineering practice for packed columns.

Individual bodies comprising the packed columns may be composed entirely of partially platinized, high surface area carbon particles dispersed in the porous matrix of polytetrafluoroethylene or may preferably be prepared by deposition of a non-porous carrier as a thin outer coating of the porous polytetrafluoroethylene matrix having the partially platinized, high surface carbon particles dispersed therein. In the catalytically active mass the platinum metal remains freely accessible to the gaseous mixture of hydrogen and water vapour and in close proximity to the bulk stream of liquid water, which is prevented from wetting the catalyst metal by the hydrophobic action of the surrounding carbon and polytetrafluoroethylene. This arrangement can be used to advantage in that considerable economy of catalyst and hydrophobic support is achieved.

If desired, the stream of gaseous hydrogen may be fed upward into contact with the catalyst and the stream of liquid water trickled downward into contact with the catalyst, so that a substantial proportion of voidage between individual bodies comprising the packed assemblies remains free of liquid water. Such a method is commonly described in the chemical engineering literature as trickle bed operation.

Alternatively, both the stream of gaseous hydrogen and the stream of liquid water may be fed con-currently in an upward or downward direction into contact with the catalyst in the individual stages in the column but with the overall flow of the two streams in the column being counter-current.

Clearly the temperature at which the streams are brought into contact with one another and the catalyst is restricted to a temperature below that at which the porous matrix of polytetrafluoroethylene is thermally stable and below that at which it loses its hydrophobic caracter. Even so the exchange process may be conducted over a wide range of temperatures.

It is a further embodiment of the present invention that the catalyst is applicable to the separation of tritium as well as deuterium. Thus the catalyst can be used for the separation of tritium (mass 3) from light hydrogen (mass 1) or the separation of tritium (mass 3) from deuterium (mass 2) as well as the separation of light hydrogen (mass 1) from deuterium (mass 2).

The accompanying drawings shown the results of tests carried out to verify the present invention.

Figure 2:
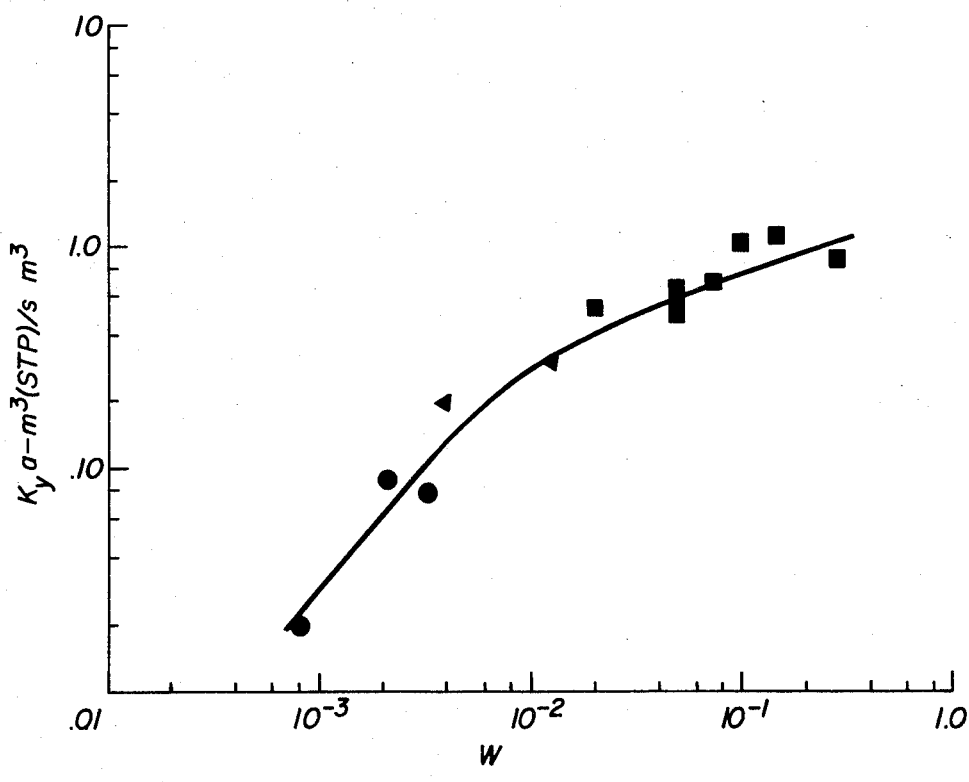
Figure 3:
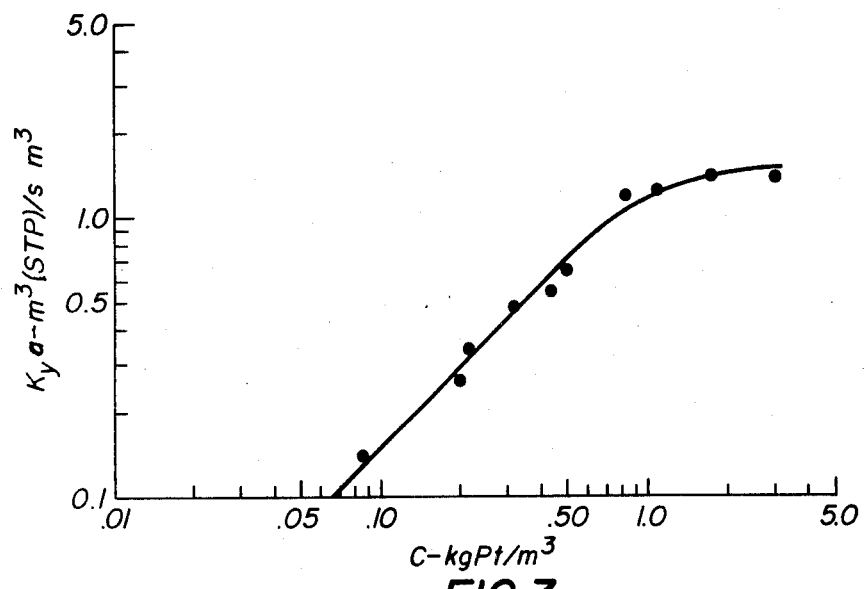
Figure 4:
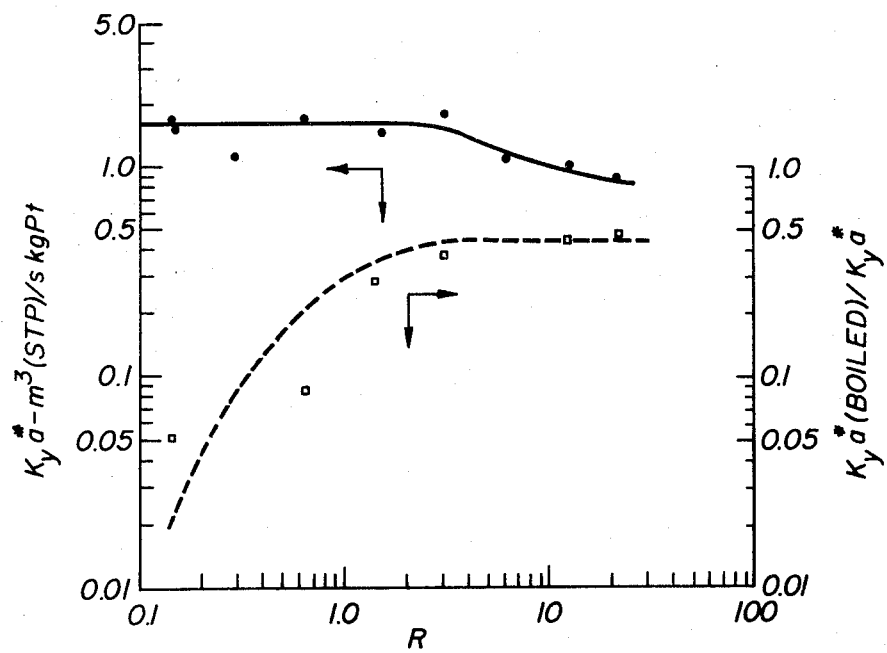
Figure 5:
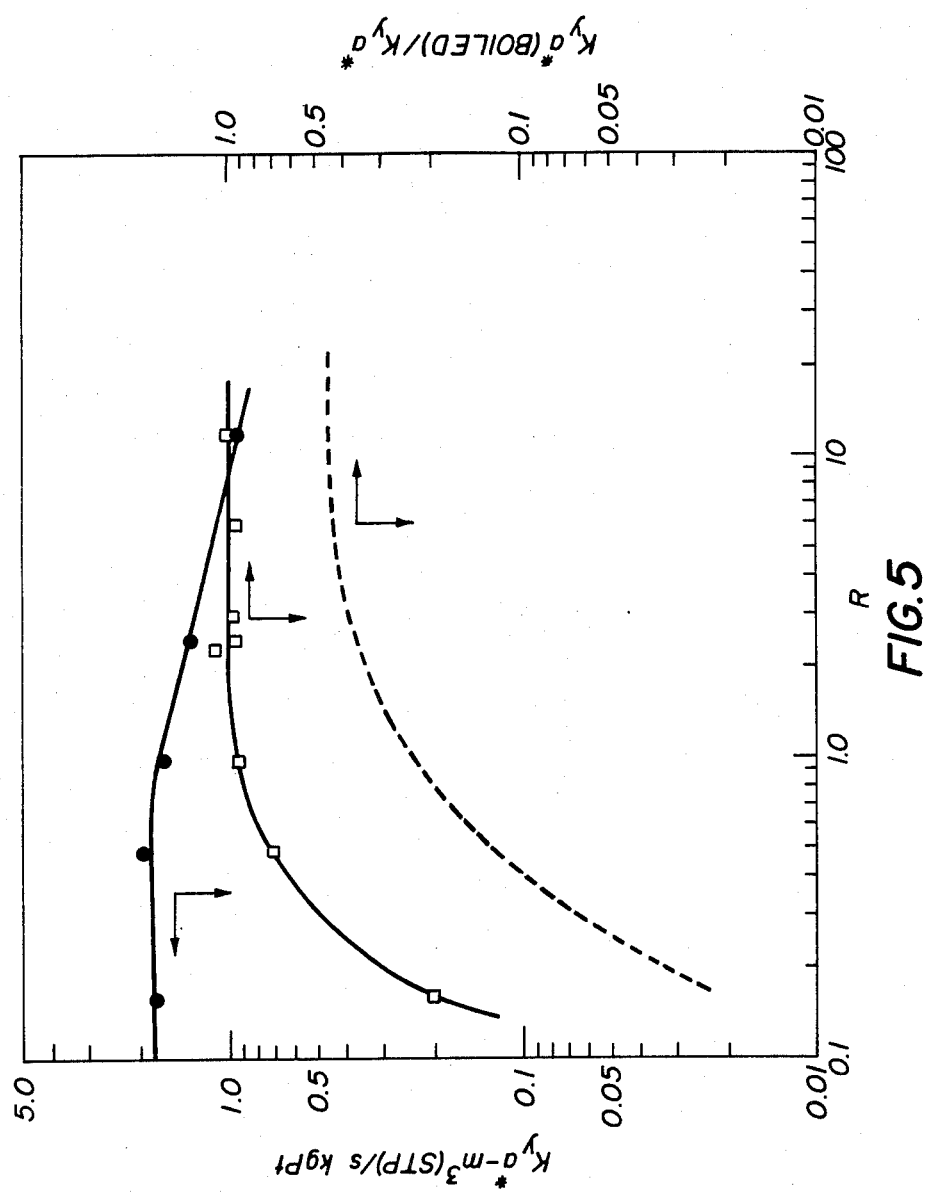

FIG. 1 is a graph showing the rate of exchange of deuterium between hydrogen gas and liquid water, $K_ya$, plotted against the superficial hydrogen gas flow rate, $F_{H_2}$, for a partially platinized high surface area carbon polytetrafluoroethylene mass deposited on stainless steel Dixon rings, FIG. 2 is a graph showing the rate of exchange of deuterium between hydrogen gas and liquid water, $K_ya$, plotted against the weight percent of platinum, W in the finished catalyst comprising, partially platinized high surface area carbon/polytetrafluoroethylene mass deposited on ceramic spheres, FIG. 3 is a graph showing the rate of exchange of deuterium between hydrogen gas and liquid water, $K_ya$, plotted against the concentration of platinum in a packed bed C, expressed as kg Pt per cubic meter of bed, and FIGS. 4 and 5 are graphs showing the specific activity of catalysts, $K_ya^*$, for the hydrogen-liquid water isotopic exchange reaction plotted against the weight ratio, R, of polytetrafluoroethylene to partially platinized high surface area carbon in the catalytically active mass deposited as a coating on ceramic spheres.

METHOD OF PREPARING CATALYST

(1) Pre-coating a Ceramic Carrier with Polytetrafluoroethylene

Ceramic spheres 0.6 cm diameter which were to be used as a catalyst carrier were dipped in a dilute dispersion (7.5-15.0% solids) of polytetrafluoroethylene, marketed under the trademark Teflon 30 by E. I. Du Pont de Nemours, to pre-coat the ceramic carrier. The polytetrafluoroethylene coated spheres were heated to 633° K. to flux the polytetrafluoroethylene and to yield a continuous hydrophobic layer. Precoating the ceramic spheres with polytetrafluoroethylene substantially prevents the penetration of the platinized high surface area carbon powder into the interior of the porous ceramic spheres when the catalyst layer is applied.

(2) Coating a Catalyst Carrier with a Catalytically Active Mass

A satisfactory dispersion of platinized high surface area carbon black powder and polytetrafluoroethylene, such as Teflon 42 (Trademark) marketed by E. I. Du Pont de Nemours, was prepared by emulsifying the partially platinized high surface area carbon black powder in water using a wetting agent such as Triton X-100 (Trademark) marketed by J. T. Baker Chemical Co., NH$_4$OH was added to keep the pH above 10 and then the polytetrafluoroethylene was added in increments to the emulsion with gentle stirring. Ceramic spheres, pretreated with polytetrafluoroethylene as described in (1), were coated with these dispersions by dipping or spraying. The coated spheres were dried in air, then in an oven at 473° K. and finally in a muffle furnace at 633° K. The emulsifying agent began to pyrolyze at 473° K. and was removed completely at 633° K. Complete removal of the emulsifier is necessary to impart high hydrophobicity to the finished catalysts. Polytetrafluoroethylene dispersions, e.g. Fluon (Trademark) marketed by ICI America or Teflon 30 (Trademark) marketed by E. I. Du Pont de Nemours could equally well be used. However, with the Teflon 30 an emulsifying agent was not always added since this preparation already contains an emulsifying agent.

Partially platinized high surface area carbon/polytetrafluoroethylene catalysts were also prepared using Teflon 30 (Trademark) marketed by E. I. Du Pont de Nemours. For catalysts fabricated with the Teflon 30 an emulsifying agent was not added since this aqueous dispersion already contained 6% Triton X-100, an emulsifying agent. Finished catalysts on 6.1 mm diameter ceramic spheres typically contained a total of about 6% polytetrafluoroethylene by weight, 3% polytetrafluoroethylene in the pre-coating of the ceramic spheres and 3% in the catalytically active mass consisting of a porour matrix of polytetrafluoroethylene with the partially platinized high surface area carbon particles therein.

PROCEDURES

Procedure 1

A weighed quantity of rough, porous ceramic spheres was dipped in a polytetrafluoroethylene dispersion such as Teflon 30 (Trademark) 20% solids, or Teflon 42 (Trademark), 17% solids, marketed by E. I. Du Pont de Nemours for one minute. Excess fluid was allowed to drain and the treated spheres were air dried in an oven for one hour at 373° K. followed by a further hour at 473° K. The polytetrafluoroethylene was cured in a muffle furnace at 733° K. for 30 minutes.

A dispersion of partially platinized high surface area carbon powder (1-10% by weight Pt) with polytetrafluoroethylene was then prepared by slowly adding the partially platinized high surface area carbon powder to a premixed polytetrafluoroethylene dispersion containing 100 ml water, 1.0 ml 58% by weight aqueous ammonia, 30 ml of the previously mentioned Triton X-100 (5% by weight solids) and 10 ml of 17% by weight solids of the previously mentioned Teflon 42 dispersion. The solution was stirred continuously during the addition and was agitated ultrasonically for one hour to form a stable free flowing dispersion. An aerosol sprayer (obtainable from Canadian Tire Corporation) was used to apply the above dispersion to the pre-coated spheres. Sufficient material was deposited in one application to visually wet the spheres. The spheres were then transferred to an oven at 110° C. to evaporate the water. Several spray coatings were applied in this manner to increase the platinum loading to the desired level. The catalytically active mass thus formed was cured by heating the coated spheres in the muffle furnace at 633° K. The latter was sufficient to remove the emulsifying agent and to provide an active platinum catalyst. Prolonged heating led to partial combustion of the carbon.

Procedure 2

Platinum catalysts were also prepared by contacting various catalyst carriers, pretreated with the previously mentioned Teflon 30 as described in Procedure 1, with a dispersion or partially platinized high surface area carbon powder Teflon 30 (Trademark) sufficient to just coat its surface so that practically no liquid dispersion remained. By way of example the following procedure was used to prepare 100 g of catalyst with a platinum weight loading of 0.1% and the partially platinized high surface area carbon powder deposited on 4.6 mm diameter ceramic spheres which served as a carrier for the catalytically active mass 1.0 g of a partially platinized high surface area carbon powder containing 10% platinum by weight was mixed with a small quantity of water, about 5 ml. in a rotary evaporator. To this mixture 5.0 g of the previously mentioned polytetrafluoroethylene dispersion known as Teflon 30 (Trademark) containing 60% solids was added, sufficient to make the polytetrafluoroethylene to partially platinized high surface area carbon weight ratio in the catalytically active mass of about 3:1. The mixture was gently stirred to form a dispersion and 96 g of polytetrafluoroethylene coated rough ceramic spheres 4.6 mm in diameter were added. The evaporator was slowly rotated to uniformly coat the spheres with the partially platinized high surface carbon/polytetrafluoroethylene mixture. Prolonged rotation of the evaporator was avoided since this tended to produce clumping or agglomeration of the partially platinized high surface area carbon/polytetrafluoroethylene mixture on the surface of the carrier. The quantity of spheres treated was such that most of the dispersion was deposited on the spheres so that there was a minimum excess of liquid dispersion remaining after the contacting. Any remaining bulk water was evaporated and the catalyst was then air dried for three hours. Further drying was accomplished by heating the catalyst at 423° K. for one hour. The polytetrafluoroethylene was cured by heating the coated spheres in a muffle furnace at 633° K. for 15 minutes. This final heating is sufficient to remove the Triton X-100, the emulsifying agent in the Telfon 30, and to completely cure the Telfon 30. The resulting catalysts had the partially platinized high surface area carbon powder firmly bonded to the surface of the porous ceramic spheres, showing no tendency to shed carbon dust. With this procedure at least 95% of the partially platinized high surface area carbon powder is deposited on the porous ceramic spheres in the catalytically active mass. Catalysts with different platinum metal loadings could easily be fabricated by varying the amount of partially platinized high surface area carbon powder used in the preparation.

Precoating of the porous ceramic spheres with polytetrafluoroethylene was generally done to prevent the platinized high surface area carbon from penetrating into the large pores in the ceramic spheres. Many of the catalysts used in the examples given in this patent application were prepared on ceramic spheres pre-coated with polytetrafluoroethylene, however, this treatment was not necessary to obtain the advantages described. Catalysts prepared without polytetrafluoroethylene pre-coating of the ceramic spheres were found to have the same catalytic activity within ±10% of those prepared with a polytetrafluoroethylene pre-coating. In addition, catalysts described in procedure 3 below were fabricated on a variety of carrier materials with no polytetrafluoroethylene pre-coating and these catalysts were generally found to be more active than those prepared on ceramic spheres with a pre-coating.

Procedure 3

Ceramic, porous carrier materials are not necessary for the preparation of partially platinized high surface area carbon/polytetrafluoroethylene catalysts suitable for the hydrogen-liquid water isotopic exchange reaction. Active catalysts have been prepared on a great variety of carrier materials which have a high surface to volume ratio. Such carriers as fibrous materials (paper or cloth), synthetic plastics and metals (sheet or gauze) have been used. These catalysts were prepared by depositing the catalytically active mass on the carrier by dipping or spraying techniques. In particular, catalysts have been prepared on stainless steel Dixon (Trademark) gauxe (100 mesh) rings (diameter×height, 0.32 cm×0.32 cm). Oil and other impurities were first removed by washing the rings in acetone, drying and heating to 1070° K. After cooling to ambient temperature, the rings, suspended in a wire basket, were dipped in a dispersion of polytetrafluoroethylene and partially platinized high surface area carbon powder (10% Pt by weight) prepared by adding the partially platinized high surface area carbon powder to a pre-mixed polytetrafluoroethylene dispersion containing 50 ml of water and 18 ml of the previously mentioned Du Pont 30 (60% by weight solids). The resulting dispersion had a polytetrafluoroethylene to partially platinized high surface area carbon weight ratio of about 3:1. The treated Dixon rings were then air dried for 30 minutes and re-dipped to obtain the desired platinum weight loading. The rings were further dried by heating for 1 hour at 373° K. The polytetrafluoroethylene was then cured by heating the rings in a hydrogen atmosphere at 633° K. to prevent the burning of the carbon which occurs if these catalyst are heated in air. The catalytically active mass was well bonded to the wire. gauze and the catalysts were very active and stable.

MEASUREMENT OF CATALYST ACTIVITY

Catalyst activities for the hydrogen isotopic exchange reaction between hydrogen gas and liquid water were measured in a trickle bed reactor. Catalysts prepared as outlined above were packed in a glass column of cross sectional area about 500 mm² to a bed depth of 0.1 to 0.3 m. Provisions were made to contact the packed catalyst bed with an upward flow of purified hydrogen enriched in deuterium (D/H≃300 ppm) and with natural liquid water (D/H=144 ppm) which was trickled downward through the catalyst bed. The hydrogen gas was first passed upward through a humidifier consisting of a column packed with non-catalytic 6.1 mm diameter rough ceramic spheres, in which the effluent water from the catalyst bed flows downward. This arrangement served to saturate the hydrogen gas with water vapour in isotopic equilibrium with the liquid water flowing from the bottom of the catalyst bed. The amount of deuterium transferred between the two streams as they passed through the catalyst bed was determined by measuring the decrease in deuterium content of the hydrogen gas stream, free of water vapour, after its passaage through the column.

The deuterium isotope exchange efficiency, $\eta$, of the packed catalyst bed was expressed as the fractional approach to complete deuterium isotope equilibration between the hydrogen and the liquid water in the catalyst bed, where $$\eta = (n - n_o)/(n_e - n_o) \tag{5}$$

and $n_o$, $n$ and $n_e$ are the observed D/H values of the hydrogen stream at the bottom of the catalyst bed, at the top of the catalyst bed and in equilibrium with the liquid water respectively.

Since the deuterium content of the liquid water changes only slightly in these test experiments, the deuterium content of the hydrogen in equilibrium with the water, $n_e$, can be assumed to be constant over the length of the catalyst bed, and can be evaluated from equation (3) and the initial D/H value of the water.

The activity of the catalyst can be conveniently expressed in terms of a volume transfer rate, $K_y a$, which defines the net amount of deuterium transferred from an isotopically enriched hydrogen stream to the liquid water in a unit of volume of packed catalyst bed under conditions of unit displacement from isotopic equilibrium. The volume transfer rate, $K_y a$, is expressed as cubic meters of HD at STP per second per cubic meter of catalyst bed (m³ (STP)·s⁻¹·m⁻³ (bed)), and can be evaluated from the efficiency, $\eta$, and the relationship $$K_y a = \left[ \frac{F_{H_2} \cdot A}{V} \right] [-\ln(1 - \eta)] \tag{6}$$

In these experiments the cubic meters of HD gas were measured under standard conditions of temperature and pressure (STP) and the standard temperature was taken as 273.15° K. and the standard pressure as one atmosphere (0.101325 MPa). In equation (6), $F_{H_2}$ is the superficial flow of hydrogen in m·s⁻¹ measured at STP, A is the cross sectional area of the column in square meters and v is the volume of the catalyst bed assembly in cubic meters.

THE ACTIVITY OF CATALYSTS—EFFECT OF HYDROGEN FLOW RATE

Test 1

The activity of a finished catalyst containing 0.29% platinum catalyst (by weight) prepared according to Procedure 1 on 6.1 mm ceramic spheres was measured in a trickle bed reactor at 298° K. and 0.11 MPa. For this catalyst the weight ratio of polytetrafluoroethylene to partially platinized high surface area carbon in the catalytically active mass was 0.38:1. The effect of hydrogen flow rate on the catalytic activity is given in Table 1.

TABLE 1

Effect of Hydrogen Flow Rate on the Activity of a 0.29% Platinum Catalyst

Conditions: Bed length - 0.1.44 m
Bed area - 546 mm²
Temperature - 298K
Pressure - 0.11 MPa
Water flow - 1.7 kg . s⁻¹ . n⁻²

| H₂ Flow (m/s at STP) | $K_y a$ (m³ (STP) . s⁻¹ . m⁻³) |
|---|---|
| 0.282 | .95 |
| 0.374 | 1.03 |
| 0.374 | 1.02 |
| 0.406 | 1.04 |
| 0.406 | 1.08 |
| 0.531 | 1.12 |
| 0.684 | 1.25 |

Test 2

A partially platinized high surface area carbon containing 10% by weight platinum was deposited on 4.6 mm diameter ceramic spheres with polytetrafluoroethylene according to Procedure 2. The resulting catalyst contained 0.32% platinum and in the catalytically active mass the ratio of the polytetrafluoroethylene to partially platinized high surface area carbon was 1.3:1. The activity of the catalyst was measured in a trickle bed reactor at 298 K and 0.11 MPa for various hydrogen flow rates and the results are given in Table 2.

made the rings more hydrophilic. The activities observed as a function of the hydrogen flow rate for both types of packed bed are summarized in Table 3.

TABLE 3

Effect of Hydrogen Flow Rate on the Activity of a 0.41% Platinum, Dixon Ring Catalyst Conditions: Bed area - 490 mm$^2$
Temperature - 298.2K
Pressure - 0.108 MPa

| Bed Length m | % Catalyst Bodies by volume | Water Flow kg . s$^{-1}$ . m$^{-2}$ | H$_2$ Flow Rate m . s$^{-1}$ at STP | K$_y$a m$^3$ (STP) . s$^{-1}$ . m$^{-3}$ |
|---|---|---|---|---|
| 0.220 | 100 | 2.2 | 0.603 | 1.39 |
| 0.115 | 100 | 2.0 | 0.326 | 1.25 |
|  |  | 2.0 | 0.638 | 1.36 |
|  |  | 2.0 | 0.775 | 1.36 |
|  |  | 2.0 | 1.052 | 1.43 |
| 0.200 | 50 | 2.04 | 0.123 | 1.22 |
|  |  | 2.04 | 0.218 | 1.33 |
|  |  | 2.04 | 0.372 | 1.46 |
|  |  | 2.04 | 0.617 | 1.60 |
|  |  | 2.04 | 1.185 | 1.92 |
| 0.200 | 50 | 2.73 | 0.254 | 1.36 |
|  |  | 2.73 | 0.421 | 1.49 |
|  |  | 2.73 | 0.726 | 1.67 |
|  |  | 2.73 | 1.185 | 1.88 |

TABLE 2

Effect of Hydrogen Flow Rate on the Activity of a 0.32% Platinum Catalyst

Conditions: Bed length - 0.152 m
Bed area - 480 mm$^2$
Temperature - 298.2K
Pressure - 0.107 MPa
Water flow - 1.9 kg . s$^{-1}$ . m$^{-2}$

| H$_2$ Flow (m/s STP) | K$_y$a (m$^3$ (STP) . s$^{-1}$ . m$^{-3}$) |
|---|---|
| 0.245 | 0.91 |
| 0.468 | 1.10 |
| 0.625 | 1.30 |
| 0.820 | 1.38 |
| 0.958 | 1.47 |
| 1.094 | 1.54 |

Test 3

Partially platinized high surface area carbon powder containing 10% platinum by weight was deposited onto stainless steel Dixon (Trademark) rings (diameter-×height, 3×3 mm, 100 mesh gauze) with the previously mentioned Teflon 30 according to Procedure 3. The resulting catalyst contained 0.41% platinum and in the catalytically active mass the ratio of polytetrafluoroethylene to platinized high surface area carbon was 2.2:1. The activity of the catalyst was measured in a trickle bed reactor at 298° K. and a pressure of 0.11 MPa. Measurements were made with packed beds containing only catalyst bodies and also with packed beds containing a random mixture of 50% by volume of Dixon rings coated with a catalytically active mass and 50% non-catalytic Dixon rings of the same size as described and claimed in a copending Canadian patent application No. 255,750, filed June 25, 1976, "A Process for the Exchange of Hydrogen Isotopes Using a Catalyst Packed Bed Assembly", Butler, den Hartog and Molson. To make the non-catalytic Dixon rings more effective for the water vapour/liquid water exchange reaction, Step 2, they were washed in acetone to degrease them and activated by heating to 1070° K. This formed an oxide layer on the surface of the rings and The addition of non-catalytic hydrophilic packing to the bed improves the performance of the catalyst. For such diluted packed beds containing 50% catalyst by volume the activity of the catalyst, K$_y$a, is 10 to 20% higher than that observed for beds containing 100% catalyst for hydrogen flows in the range 0.3 to 1.2 m·s$^{-1}$ at STP. Thus the specific activity, K$_y$a*, for the diluted beds is a factor of 2.2 to 2.4 greater than that obtained for beds containing 100% catalyst. The specific activity, K$_y$a*, is defined as the overall rate of the deuterium exchange reaction for unit concentration of platinum in the packed catalyst bed where $$K_ya^* = K_ya/\text{kg Pt per m}^3 \text{ of packed catalyst bed} \quad (7)$$

The specific activity gives a measure of how efficiently the platinum metal is being utilized. The results obtained for packed beds containing 50% by volume of this catalyst and 50% non-catalytic hydrophilic Dixon rings are shown in FIG. 1. In FIG. 1, 0 is for a water flow rate of 2.04 kg·s$^{-1}$·m$^{-2}$ and ● for a water flow rate of 2.73 kg·s$^{-1}$·m$^{-2}$ where the volume transfer rate, K$_y$a (m$^3$(STP)·s$^{-1}$·m$^{-3}$) is plotted against the superficial hydrogen flow rate, F$_{H_2}$ (m·s$^{-1}$ STP), for a packed bed containing 50% catalyst and 50% Dixon rings for the conditions detailed in Table 3. Although the activity, K$_y$a, increases markedly with hydrogen gas flow rate, actually as the 0.20 power, the activity is essentially independent of the liquid flow rate in the flow range reported (see FIG. 1).

SUMMARY OF CATALYST PERFORMANCE

These initial tests clearly demonstrate that very effective catalysts for the hydrogen isotope exchange reaction between hydrogen gas and liquid water have been prepared from partially platinized high surface area carbon particles bonded and wetproofed with polytetrafluoroethylene to a carrier. Active catalysts have been prepared on a variety of materials which serve as carriers for the catalytically active mass consisting of a porous matrix of polytetrafluoroethylene with partially platinized high surface area carbon particles dispersed therein. Substances such as ceramics, fibrous materials (paper, cloth), synthetic platics and metals (sheet or gauze) have been employed as carriers. Various dispersions of small, partially platinized carbon particles with a nominal diameter of 5 to 50 nm and polytetrafluoroethylene particles with a nominal diameter of 50 to 500 nm have been used in the fabrication of the catalytically active masses. The porous polytetrafluoroethylene matrix containing the partially platinized carbon particles was deposited on the carriers by spraying or dipping the carrier followed by evaporation of the water or by continuous rotary evaporation of the water from the dispersion in the presence of the carriers. The examples given above are descriptions of the actual laboratory procedures used for the preparation of catalysts, however, in no way are they to be construed as limiting the techniques available for the large scale preparation of catalysts. Other techniques will suggest themselves to those skilled in the art such as electrostatic spraying or repetitive dip-dry cycles.

The activity of the catalysts reported in these tests at 298° K. and 0.1 MPa are 4 to 7 times more active then the most active catalyst reported in the previously mentioned Stevens' patent. The activity of the catalysts, $K_y a$, increases markedly with hydrogen gas flow rate and in these tests the rate of increase varied from 0.1 to the 0.35 power of the gas flow rate. For liquid flow rates greater than 0.5 kg·s$^{-1}$·m$^{-2}$ the activity of the catalysts increases only slightly with liquid flow and for flows above 1.5 kg·s$^{-1}$·m$^{-2}$, $K_y a$ is essentially constant and nearly independent of liquid flow rate.

DEPENDENCE OF CATALYST ACTIVITY ON THE PLATINUM METAL LOADING

Test 4

A series of catalysts with a range of metal loadings, expressed as weight percent of the finished catalysts, were prepared with 6.1 mm diameter ceramic spheres by Procedure 1 given above. The different platinum loadings were obtained by using three different partially platinized carbon powders containing 0.5, 1.0 AND 10% platinum by weight and by varying the amount of partially platinized carbon used in the preparation of the catalytically active masses. The activities of the finished catalysts were measured in a trickle bed reactor at 298° K. and at a pressure of 0.10 MPa. The activities $K_y a$, are shown plotted against (W) weight % platinum in the finished catalyst in FIG. 2 for a hydrogen gas flow rate of 0.67 m·s$^{-1}$ at STP and liquid water flow of 1.7 kg·s$^{-1}$·m$^{-2}$. In FIG. 2, catalysts fabricated from partially platinized carbon powder containing 0.5% by weight Pt are designated ●, those containing 1.0% by weight Pt are designated ▲ and those containing 10% by weight Pt are designated ■. For platinum loadings below about 0.1% by weight, the activity increase is nearly directly proportional to the metal loading. The linear dependence decreases significantly above this loading since the overall exchange rate between hydrogen and liquid water is being increasingly limited by the rate of the non-catalytic reaction, Step 2. The data are sufficient to show that the preferred amount of platinum for this finished catalyst lies in the region of 0.1 to 0.2% by weight under these operating conditions. Different limits may be preferred for operation under different temperature, pressure and flow conditions.

Test 5

A second series of catalysts with platinum loadings varying from 0.038 to 0.51% by weight were prepared with 4.6 mm diameter ceramic spheres using Procedure 2. The catalysts were fabricated from a partially platinized high surface area carbon powder containing 10% platinum by weight. Catalysts with different platinum loadings were obtained by varying the amount of partially platinized high surface area carbon powder used in their preparation. For these finished catalysts the catalytically active mass comprising the porous matrix of polytetrafluoroethylene with partially platinized high surface area carbon particles dispersed therein had polytetrafluoroethylene to platinized carbon ratios in the range 1.3:1 to 3.4:1 except for the catalyst having the lowest platinum loading, 0.038%, where the ratio was 6.1:1.

The activities of the catalysts were measured in a trickle bed reactor at 298° K. and a pressure of 0.107 MPa. Measurements were made in packed catalyst beds with the catalyst bodies diluted and randomly mixed with non-catalytic hydrophilic ceramic spheres of the same size as described in a copending Canadian patent application No. 255,750, filed June 25, 1976, "A Process for the Exchange of Hydrogen Isotopes Using a Catalyst Packed Bed Assembly", Butler, den Hartog and Molson. The addition of the non-catalytic hydrophilic ceramic spheres increases the rate of the water vapour/liquid water isotopic exchange reaction, Step 2, and hence enhances the overall exchange reaction between hydrogen and liquid water. The packed catalyst bed normally consisted of a random mixture of 50% catalyst bodies by volume and 50% non-catalytic hydrophilic ceramic spheres of the same size. Some measurements were also made with the packed beds containing 20% catalyst and 80% ceramic spheres. The activities, $K_y a$ (m$^3$(STP)·s$^{-1}$·m$^{-3}$), of the various catalysts in diluted packed beds are shown in FIG. 3, as a function of the platinum concentration per unit volume of bed, C, (kg Pt/m$^3$(bed)), for a hydrogen flow rate of 0.60 m·s$^{-1}$ at STP and a liquid water flow of 2.3 kg·s$^{-1}$·m$^{-2}$. In FIG. 3 the column length was 0.20 m, the column area was 480 mm$^2$, the temperature was 298° K. and the pressure was 0.108 MPa.

For platinum metal concentrations in the bed less than 0.8 kg·m$^{-3}$, the overall exchange rate, $K_y a$, was primarily limited by the rate of isotopic exchange between hydrogen gas and water vapour, the catalytic reaction, Step 1. As seen by the data in FIG. 3, in this range $K_y a$ increased in proportion to the platinum metal concentration, or, more precisely, to the platinum metal surface area per unit volume of bed. Metal surface areas for these catalysts were determined by hydrogen chemisorption and 1 kg Pt/m$^3$ (bed) was equivalent to a platinum metal area of $8.2 \times 10^4$ m$^2$/m$^3$ (bed). For higher platinum concentrations the linear dependence decreased significantly since the rate of the isotopic exchange between water vapour and liquid water, the non-catalytic reaction, Step 2, began to limit the overall exchange rate. At even higher platinum concentrations, $K_y a$, will be completely limited by the non-catalytic reaction, Step 2, and will not increase with increasing platinum concentration. In this experiment the $K_y a$ values are somewhat higher than in Test 4 as a result of the addition to the packed catalyst bed of the non-catalytic, hydrophilic ceramic spheres which enhanced the rate of water vapour/liquid water isotopic exchange reaction.

DEPENDENCE OF CATALYST ACTIVITY ON THE POLYTETRAFLUOROETHYLENE LOADING IN THE CATALYTICALLY ACTIVE MASS

Test 6 (a)

The amount of polytetrafluoroethylene dispersion (Teflon 30) used in the fabrication of the catalytically active mass was varied to determine the effect of this parameter on the catalytic activity and platinum metal surface area carbon powder containing 10% platinum by weight was used to prepare catalytically active masses on 4.6 mm diameter rough ceramic spheres according to Procedure 2. For these catalysts the weight ratio of polytetrafluoroethylene to the partially platinized carbon powder in the catalytically active mass was varied from 0.14:1 to 21.6:1 while the platinum metal loading was maintained constant at about 0.08% platinum by weight of the finished catalyst. Catalytic activities, $K_ya$, for the hydrogen-liquid water isotopic exchange reaction were measured at 298° K. and a pressure of 0.108 MPa in a trickle bed reactor with the packed catalyst beds containing a random mixture of 50% catalyst bodies by volume and 50% non-catalytic hydrophilic ceramic spheres of the same size. The activities of the finished catalysts, $K_ya$, reported in Table 3 are for a hydrogen flow rate of 0.60 m·s$^{-1}$ at STP and are the constant values observed during the second day of continuous operation of the column.

Platinum metal surface areas for the different finished catalysts were measured by hydrogen chemisorption after prior reduction in hydrogen. The metal areas of the catalysts, expressed as m$^2$ per g of Pt, were essentially constant with an average value of 85 m$^2$/g Pt and the metal areas exhibited no trend with variations in the weight ratio of polytetrafluoroethylene to partially platinized carbon powder in the catalytically active mass from 0.14:1 to 21.6:1 In contrast, the data in Table 4 and FIG. 3 show that there is a marked decrease in the specific activity, $K_ya^*$, for catalyst with a polytetrafluoroethylene to partially platinize carbon weight ratio of 6:1 or greater in the catalytically active mass. In FIG. 4 the specific activity of catalysts, $K_ya^*$, is plotted against the weight ratio (R) of polytetrafluoroethylene to partially platinized high surface area carbon in the catalytically active mass and the continuous line is for finished catalysts prepared and tested with no intermediate treatment while the dotted line is for catalysts which were tested after being boiled and immersed in water. In the case of the catalysts boiled and immersed in water the ratio $K_ya^*$ (Boiled/$K_ya^*$ No intermediate treatment), $K_ya^*$ (Boiled)/$K_ya^*$, is plotted against the weight ratio (R) of polytetrafluoroethylene to partially platinized high surface area carbon in the catalytically active mass. In all cases the packed catalyst bed contained 50% catalyst bodies and 50% non-catalytic, hydrophilic, rough, ceramic spheres.

TABLE 4

Effect of Teflon Loading on the Activity of Platinum-Carbon-Teflon Catalysts

Conditions: Bed length - 0.20 m
Bed area - 480 mm$^2$
Temperature - 298.2K
Pressure - 0.108 MPa
Water flow - 1.7–2.0 kg . s$^{-1}$ . m$^{-2}$
Hydrogen flow - 0.60 m . s$^{-1}$ at STP

| Catalyst No. | Teflon/Pt-C wt. ratio,R | Wt % Pt | Pt conc. kg/m$^3$ (bed) | $K_ya$ m$^3$(STP) . s$^{-1}$ . m$^{-3}$ | $K_ya^*$ m$^3$(STP) . s$^{-1}$ . kg$^{-1}$ (Pt) |
|---|---|---|---|---|---|
| T51 | 0.14 | 0.098 | 0.481 | 0.80$_5$ | 1.67 |
| T49 | 0.14$_5$ | 0.087 | 0.488 | 0.67$_5$ | 1.51 |
| T50 | 0.28 | 0.094 | 0.468 | 0.52 | 1.11 |
| T46 | 0.63 | 0.085 | 0.458 | 0.79 | 1.72 |
| T36 | 1.50 | 0.094 | 0.535 | 0.78 | 1.46 |
| T32 | 3.01 | 0.084 | 0.478 | 0.84 | 1.76 |
| T37 | 6.0 | 0.081 | 0.479 | 0.52 | .08 |
| T40 | 11.9 | 0.071 | 0.442 | 0.46 | 1.04 |
| T47 | 21.6 | 0.078 | 0.505 | 0.45 | 0.89 |

In these experiments, the results of which are shown in Table 3 and illustrated in FIG. 4, the catalytic activity was determined in packed catalyst beds in which the platinum concentration was maintained nearly constant in the range 0.44 to 0.54 kg Pt/m$^3$ (bed). As seen by results of Test 5 and FIG. 3, in this platinum concentration range the overall exchange rate, $K_ya$ is primarily limited by the catalytic reaction, Step 1, and thus any improvement or deterioration of the catalytically active mass will cause a corresponding change in the measured activity, $K_ya$ of the finished catalyst. The decrease of the specific activity of the catalysts for the higher weight loadings of polytetrafluoroethylene (see FIG. 4) probably results from the greater diffusion path lengths of the gaseous components in the catalytically active mass comprising polytetrafluoroethylene and partially platinized high surface area carbon. Although catalysts with small ratios of polytetrafluoroethylene to partially platinized high surface area carbon, ratios 0.14:1 to 0.3:1, had about the same specific activity during the second day of operation, the catalyst did not appear to be as stable as those with ratios greater than 1:1. Furthermore the activity of catalysts with these low values of the ratio R decreased somewhat with time. These catalysts were also more prone to wetting and there was some loss of activity when the catalyst bed was flooded several times.

To define more precisely the effect of the weight ratio, R, of polytetrafluoroethylene to partially platinized high surface area carbon in the catalytically active mass, the catalysts, having different polytetrafluoroethylene loadings, were subjected to the following test to investigate the effectiveness and permanence of the wetproofing of the partially platinized high surface area carbon powder by the porous polytetrafluoriethylene (Teflon) matrix under conditions more severe than those normally encountered in the trickle bed reactor. Samples of the catalysts were boiled in water at 373° K. for two hours and then maintained immersed in water for an additional 18 hours. After this treatment, the catalytic activity was remeasured in a trickle bed reactor under the same conditions as described above. The ratio of the observed specific activity measured after boiling and immersion in water to that observed initially, $K_ya^*$ (boiled)/$K_ya^*$ (No intermediate treatment), $K_ya^*$ (Boiled)/$K_ya^*$, is plotted against the weight ratio R as the dotted curve in FIG. 4. All catalysts showed a loss of activity after boiling and immersion in water. The effect on the activity of catalysts with low polytetrafluoroethylene to partially platinized high surface area carbon ratios in the catalytically active mass was surprisingly drastic, for example, for a ratio of 0.14:1 the catalytic activity was reduced by a factor of about 20. For catalysts with values of the ratios, R, greater than 1.5:1 in the catalytically active mass, the catalytic activity ratio, $K_ya''$ (Boiled)/$K_ya^*$, was remarkably constant at about 0.45 which is equivalent to a 55% decrease in the activity of the catalyst as a result of boiling. On drying the catalysts in air at 423K for one hour most of the activity loss was recorded showing that no permanent damage to the catalytically active mass resulted from exposure to liquid water at 373° K.

area carbon in the catalytically active mass and the continuous line through the solid points is for catalysts prepared and tested with the boiling treatment. In these experiments the catalytic activity was determined in packed catalyst bed in which the platinum concentration was maintained nearly constant between 0.32 and 0.47 kg Pt/$m^3$ (bed). In this platinum concentration range as seen by the results of Test 5 and FIG. 3, the overall exchange rate, $K_ya$, is primarily limited by the catalytic reaction, Step 1, and thus any improvement or deterioration of the catalytically active mass will cause a corresponding change in the measured activity, $K_ya$ of the finished catalysts. The decrease of the specific activity of the catalysts for the high weight loadings of polytetrafluoroethylene (see FIG. 5) probably results from the greater diffusion path lengths of the gaseous components in the polytetrafluoroethylene, partially platinized high surface area carbon layer.

TABLE 4 (b)

Effect of Teflon Loading on the Activity of Platinum-Carbon-Teflon Catalysts

Conditions: Bed length - 0.24 m
Bed area - 480 $mm^2$
Temperature 298.2K
Pressure - 0.108 MPa
Water flow - 1.7–2.0 kg . $s^{-1}$ . $m^{-2}$
Hydrogen flow - 0.60 m . $s^{-1}$ at STP

| Catalyst No. | Teflon/Pt-C wt. ratio, R | | Pt conc. kg/$m^3$ (bed) | $K_ya$ $m^3$ (STP) . $s^{-1}$ . $m^{-3}$ | $K_ya^*$ $m^3$ (STP) . $s^{-1}$ . $kg^{-1}$ (Pt) |
|---|---|---|---|---|---|
| T-54 | 0.16 | .090 | 0.453 | .80$_5$ | 1.78 |
| T-55 | 0.49 | .087 | 0.449 | .86 | 1.92 |
| T-57 | 0.98 | .093 | 0.472 | .78 | 1.65 |
| T-60 | 2.50 | .091 | 0.456 | .61$_5$ | 1.35 |
| T-61 | 11.9 | .081 | 0.439 | .40$_5$ | 0.92 |

Test 6(b)

The effect of the amount of polytetrafluoroethylene in the catalytically active mass on the activity of finished catalysts was further investigated using a different type of high surface area carbon powder partially platinized to give a product containing about 10% platinum by weight. Catalytically active masses were prepared with this platinized carbon powder on 6.1 mm diameter rough ceramic spheres using Procedure 2 in a manner similar to that described in Test 6(a). For this series of finished catalysts the weight ratio of polytetrafluoroethylene to the partially platinized carbon powder in the catalytically active mass was varied from 1.16:1 to 12:1 while the platinum metal loading on the catalysts was maintained nearly constant at about 0.09% platinum by weight. Catalytic activities, $K_ya$, for the hydrogen-liquid water exchange reaction were measured at 298° K and at a pressure of 0.108 MPa in a trickle bed reactor. The packed catalyst beds contained a random mixture of 50% catalysts bodies by volume and 50% non-catalytic hydrophilic ceramic spheres of the same size. The activities, $K_ya$, of the various catalysts are given in Table 4(b) for a hydrogen flow rate of 0.60 m·$s^{-1}$ at STP. The values reported are the constant values observed during the second or third day of continuous operation of the column.

The date in Table 4(b) again show (as in Test 6(a)) that there is a significant decrease in the specific activity, $K_ya^*$, for catalyst with values of the ratio, R, greater than 3:1. In FIG. 5 the specific activity of the catalysts, $K_ya^*$, is plotted against the weight ratio (R) of polytetrafluoroethylene to partially platinized high surface area carbon in the catalytically active mass and the continuous line through the solid points is for catalysts prepared and tested with the boiling treatment. In these As in Test 6(a) the effectiveness and permanence of the wetproofing of the partially platinized high surface area carbon powder by the porous polytetrafluoroethylene in the catalytically active mass was tested by boiling the catalyst in water at 373° K. for two hours and then maintaining the catalyst immersed in the water for an additional 18 hours. After this treatment the activity of the catalysts was remeasured in a trickle bed reactor under the same conditions as described above. The ratio of the observed specific activity measured after boiling and immersion in water to that initially observed, $K_ya^*$ (boiled)/$K_ya^*$, is given as the solid line through the open squares in FIG. 5. For catalysts with a polytetrafluoroethylene to partially platinized high surface area carbon weight ratio in the catalytically active mass, R, less than about 0.8 there is a surprising loss of activity after boiling and immersing the catalyst in water. Even more surprising, catalysts with a ratio R greater than 1.0:1 showed no appreciable loss of activity after the boiling treatment. The effect of polytetrafluoroethylene loading in the catalytically active mass on the activity of the finished catalyst is similar to those obtained in Test 6(a) shown in FIG. 4 and also as the dashed line in FIG. 5. In Test 6(a), although stable catalysts were obtained when the polytetrafluoroethylene to partially platinized high surface area carbon ratios, R, were greater than 1.5:1 the activity of the catalyst decreased by 55% as a result of the boiling treatment, while in the present test the boiling treatment produced essentially no loss in the catalytic activity for ratios R greater than about 1.00:1. The results obtained in this test, Test 6(b), are typical of the behaviour that has been observed with several other samples of platinized carbon powders.

SUMMARY OF THE EFFECT OF POLYTETRAFLUOROETHYLENE LOADING IN THE CATALYTICALLY ACTIVE MASS

From the results of these tests, Test 6(a) and 6(b) as summarized in FIG. 4 and FIG. 5, it is clear that with a weight ratio R of polytetrafluoroethylene to partially platinized high surface area carbon in the catalytically active mass of six or more there is a dramatic decline in the specific catalyst activity, and for the range 0.5:1 to 5:1 a superior catalysts are obtained. For catalysts with ratios R above the ratio 5:1 in the catalytically active mass the specific catalyst activity decreases as a result of the greater diffusion path lengths in the thicker Teflon-platinized carbon layer. For catalysts with ratios lower than 0.5:1 there is a pronounced loss of activity and stability after treatment with boiling water. These tests indicate that the best catalytic activity and stability is obtained with the Teflon to platinized carbon ratio in the catalytically active mass in the range 1:1 to 3:1 which is at least five times higher than the corresponding ratios calculated from the data given by Adlhart, et al., in the previously mentioned German patent application.

THE SEPARATION OF TRITIUM BY THE HYDROGEN-LIQUID WATER ISOTOPIC EXCHANGE REACTION

Test 7

To demonstrate that the hydrogen-water isotopic exchange reaction of the present invention can be applied to the isotopic separation of tritium (mass 3), as well as to deuterium (mass 2) as shown in the previous examples, a test was performed with trace quantities of tritiated water in the feed water to the trickle bed reactor. In this test a catalyst similar to that described in Test 2 was used but with the partially platinized high surface area carbon containing 10% platinum deposited and bonded with Teflon (Du Pont 30) to 6.1 mm diameter ceramic spheres. The resulting finished catalyst contained 0.25% platinum and the ratio R of the polytetrafluoroethylene to the partially platinized high surface area carbon in the catalytically active mass was 3.0:1.

The activity of the catalyst for light hydrogentritium isotopic exchange was measured in a trickle bed reactor at 298° K. and a pressure of 0.117 MPa. Measurements were made with a packed bed containing a random mixture of 50% catalyst bodies by volume and 50% non-catalytic hydrophilic ceramic spheres of the same size, as described and claimed in a copending Canadian patent application No. 255,750 filed June 25, 1976, "A Process for the Exchange of Hydrogen Isotopes Using a Catalyst Packed Bed Assembly", Butler, den Hartog and Molson. In this test, the packed catalyst bed was contacted with an upward flow of purified natural hydrogen (D/H=118 ppm) containing essentially no tritium (T/H≈2×10$^{-16}$) and with a downward flow of liquid water which contained tritium at a radio-activity level of 5.70 μCi/g of water (T/H=1.76×10$^{-9}$). The liquid water was also enriched in deuterium (D/H=1043 ppm) so that the activity of the catalyst for the separation of deuterium could be measured simultaneously with the corresponding measurements for the separation of tritium. As in the previous tests the hydrogen gas was first passed upward through a humidifier consisting of a column packed with non-catalytic 6.1 mm diameter ceramic spheres, in which the effluent water from the catalyst bed flowed downward. This arrangement served to saturate the hydrogen gas with water vapour in isotopic equilibrium with the liquid water leaving the bottom of the catalyst bed.

The amount of tritium and deuterium transferred between the two streams as they passed through the catalyst bed was determined by measuring the increase in the tritium and deuterium content of the hydrogen gas stream, free of water vapour, after its passage through the column. Samples of the dry effluent hydrogen which contained ≈0.3 mCi/m$^3$ at STP (T/H≈1.2×10$^{-10}$) were oxidized to water in a burner using a 75% oxygen-argon gas stream. The resulting water was collected in a liquid nitrogen trap and its tritium content was determined by liquid scintillation counting. The tritium isotope exchange efficiency, η, for the column was calculated in a manner analogous to that described for deuterium (see section, Measurement of Catalyst Activity). In the calculation the equilibrium constant for the isotopic exchange reaction between HT and natural liquid water $$HT_{gas} + H_2O_{liquid} \rightleftharpoons HTO_{liquid} + H_2 \text{ gas}$$

was taken as 7.00 at 298° K. Measurement of the activity of the catalyst for the separation of tritium and for the separation of deuterium in a trickle bed reactor at 298° K. and 0.117 MPa are summarized in Table 5 for various hydrogen flow rates.

TABLE 5

The Activity of a 0.25% Platinum-Carbon-Teflon Catalyst for the Separation of Tritium and for the Separation of Deuterium Conditions: Bed length - 0.250 m
Bed area - 480 mm$^2$
Temperature - 298.2K
Pressure - 0.1166 MPa
Water flow - 1.9 kg . s$^{-1}$ . m$^{-2}$

| Hydrogen flow (m/s STP) | For Tritium | For Deuterium |
|---|---|---|
| 0.273 | 1.17 | 0.73$_3$ |
| 0.418 | 1.22 | 0.77$_5$ |
| 0.686 | 1.29 | 0.89$_9$ |
| 1.260 | 1.46 | 1.01$_6$ |

These results clearly demonstrate that the process using catalytically active masses according to the present invention are very effective for the tritium (mass 3)—light hydrogen (mass 1) as well as for the deuterium (mass 2)—light hydrogen (mass 1) isotopic exchange reaction between hydrogen gas and liquid water. From Table 5 it can be seen that the rate of the tritium isotopic exchange reaction is about 1.5 times faster than that for the deuterium isotopic exchange reaction under the above operating conditions. These results indicate that in the isotopic exchange reaction between hydrogen gas and liquid water there is an inverse kinetic isotope effect.

We claim:

1. A catalytically active mass for the exchange of hydrogen isotopes between streams of gaseous hydrogen and liquid water, comprising:
   (a) a porous matrix of polytetrafluoroethylene, and
   (b) exposed, partially platinized high surface area carbon particles dispersed in the porous matrix of polytetrafluoroethylene, and wherein the improvement comprises:
   (c) the exposed, partially platinized high surface area carbon particles are dispersed throughout the whole of the porous matrix of polytetrafluoroethylene in the weight ratio 1:1 to 3:1 of polytetrafluoroethylene to partially platinized high surface area carbon particles.

2. A catalytically active mass according to claim 1, wherein the porous matrix with the exposed, partially platinized high surface area carbon particles therein is a coating on a catalyst carrier.

3. A catalytically active mass according to claim 2, wherein the catalyst carrier is of a material selected from the group consisting of ceramics, fibrous materials, synthetic plastics and metals.

4. A catalytically active mass according to claim 2, wherein the catalyst carrier is a corrugated metal sheet.

5. A catalytically active mass according to claim 2, wherein the catalyst carrier is a corrugated metal gauze.

6. A catalytically active mass according to claim 2, wherein the catalyst carrier is a stainless steel gauze ring.

* * * * *